United States Patent [19]

Semans et al.

[11] Patent Number: 5,178,543
[45] Date of Patent: Jan. 12, 1993

[54] BASIC FLUID SYSTEM TRAINER

[75] Inventors: Joseph P. Semans, Uniontown; Peter G. Johnson, Pittsburgh; Robert F. LeBoeuf, Jr., Clairton, all of Pa.; Joseph A. Kromka, Idaho Falls, Id.; Ronald H. Goron, Connellsville; George D. Hay, Venetia, both of Pa.

[73] Assignee: The United States of America as represented by the United States Department of Energy, Washington, D.C.

[21] Appl. No.: 693,477

[22] Filed: Apr. 30, 1991

[51] Int. Cl.[5] .............................. G09B 23/00
[52] U.S. Cl. ................................ 434/218; 434/126
[58] Field of Search ............... 434/218, 300, 126; 137/566, 567; 417/62, 63

[56] References Cited

U.S. PATENT DOCUMENTS 2,655,176 10/1953 Dreyfuss et al. .
2,987,830 6/1961 Jackson .
3,363,340 1/1968 McKinley .
3,379,864 4/1968 Petersen .
3,673,705 7/1972 Wright et al. .
3,801,224 4/1974 Eberhardt .................. 417/62
4,378,675 4/1983 Otto ........................... 137/567
4,545,766 10/1985 Schoessow .

Primary Examiner—Richard J. Apley
Assistant Examiner—Glenn E. Richman
Attorney, Agent, or Firm—Michael P. Hoffman; William R. Moser; Richard E. Constant

[57] ABSTRACT

A trainer, mounted and housed within a mobile console, is used to teach and reinforce fluid principles to students. The system trainer has two centrifugal pumps, each driven by a corresponding two-speed electric motor. The motors are controlled by motor controllers for operating the pumps to circulate the fluid stored within a supply tank through a closed system. The pumps may be connected in series or in parallel. A number of valves are also included within the system to effect different flow paths for the fluid. In addition, temperature and pressure sensing instruments are installed throughout the closed system for measuring the characteristics of the fluid, as it passes through the different valves and pumps. These measurements are indicated on a front panel mounted to the console, as a teaching aid, to allow the students to observe the characteristics of the system.

10 Claims, 4 Drawing Sheets

BASIC FLUID SYSTEM TRAINER

The Government has rights in this invention pursuant to Contract No. N00024-79-C4026, awarded by the United States Department of Navy to Westinghouse Electric Corporation.

FIELD OF THE INVENTION

The present invention relates to an apparatus for teaching or reinforcing basic fluid principles to operators, such as Machinist's Mates, in a closed fluid system.

BACKGROUND OF THE INVENTION

A basic fluid theory training course is an integral part of a Machinist's Mate training prior to prototype plant training. This course introduces the students to the principles involved in the flow of incompressible fluids through piping systems and how flow characteristics are utilized to determine the operating point of a fluid system. The training incorporates basic hydraulic concepts, energy balances, conduit flow, head loss, volumetric resistance coefficients, volume flow rate, pump head, system characteristic curves, pump curves, and the system operating point. There exists a need for developing a fluid system training device to reinforce the basic principles taught in the fluid theory course.

BRIEF DESCRIPTION OF THE PRESENT INVENTION

The Basic Fluid System Trainer includes a mobile console approximately five (5) feet high, five (5) feet wide and three (3) feet deep with front and rear access doors and front instrumentation and control panels. The console houses two centrifugal pumps each driven by a two speed electric motor, motor controllers, a circuit breaker, a water supply tank, a flow meter, valves, and associated plumbing to permit the operation of the pumps in series or in parallel. Temperature and pressure sensing instruments are installed with front panel indication to permit the observation and recording of system and supply tank temperatures, system pressure at key locations, and the differential pressure across the pumps. A detailed flow schematic is provided on the front panel of the trainer to identify the system components and to provide hand-operated valves to select flow paths.

A detailed laboratory exercise book and laboratory workbook can also be prepared for use with the trainer. The Laboratory Exercise Book may provide an introduction to the trainer and exercises to reinforce basic fluid theory principles.

The Basic Fluid System Trainer differs from the known technology in its structure and the results that may be obtained. The trainer was designed so that two students could use it at the same time. One student can operate the trainer while the other student can read the procedure and assure that each operational step is completed correctly. Both students can record data, and switch roles after each exercise. This introduces the students to equipment operation with verbatim procedure compliance. During the exercises, students may also be introduced to reading instruments, recording data, and positioning valves, which are daily tasks a Machinist's Mate is required to perform aboard ship. In addition, while conducting the exercises, students may be required to perform calculations to obtain analytical data to complete an exercise and to obtain experimental data from the trainer for comparison. In all cases, the results should be in reasonable agreement and demonstrate the validity of the basic principles taught in the fluid-theory course.

Fluid theory has been taught to Machinist's Mates in the Naval Nuclear Power School for many years. In years past, students have had some difficulty understanding and applying this topic. The development of the Basic Fluid System Trainer, therefore, provides a tool that students may use to obtain a better understanding of how a fluid system operates, and a tool that may be used to demonstrate the application of basic fluid theory principles that govern pump characteristic curves, pump relationships, combined pump curves, resistance coefficients, head loss curves, system characteristic curves and pump and system operating points.

The above-mentioned advantages of the present invention will become more apparent and the invention itself will be best understood by reference to the following description of an embodiment of the invention taken in conjunction with the accompanying drawings, wherein:

DETAILED DESCRIPTION OF THE INVENTION

Figure 1:
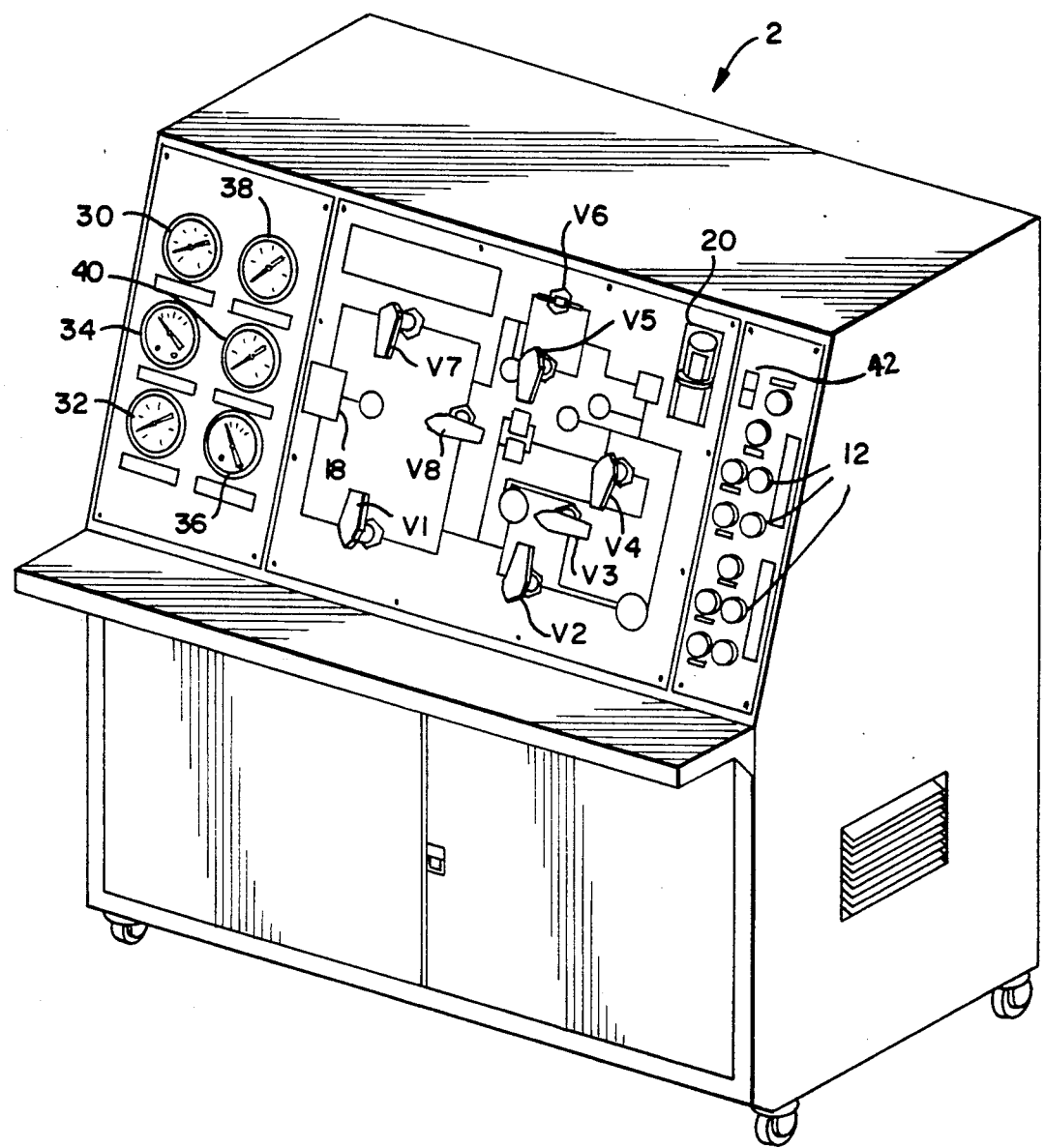
FIG. 1 is a perspective view of a mobile console trainer of the present invention.
Figure 2:
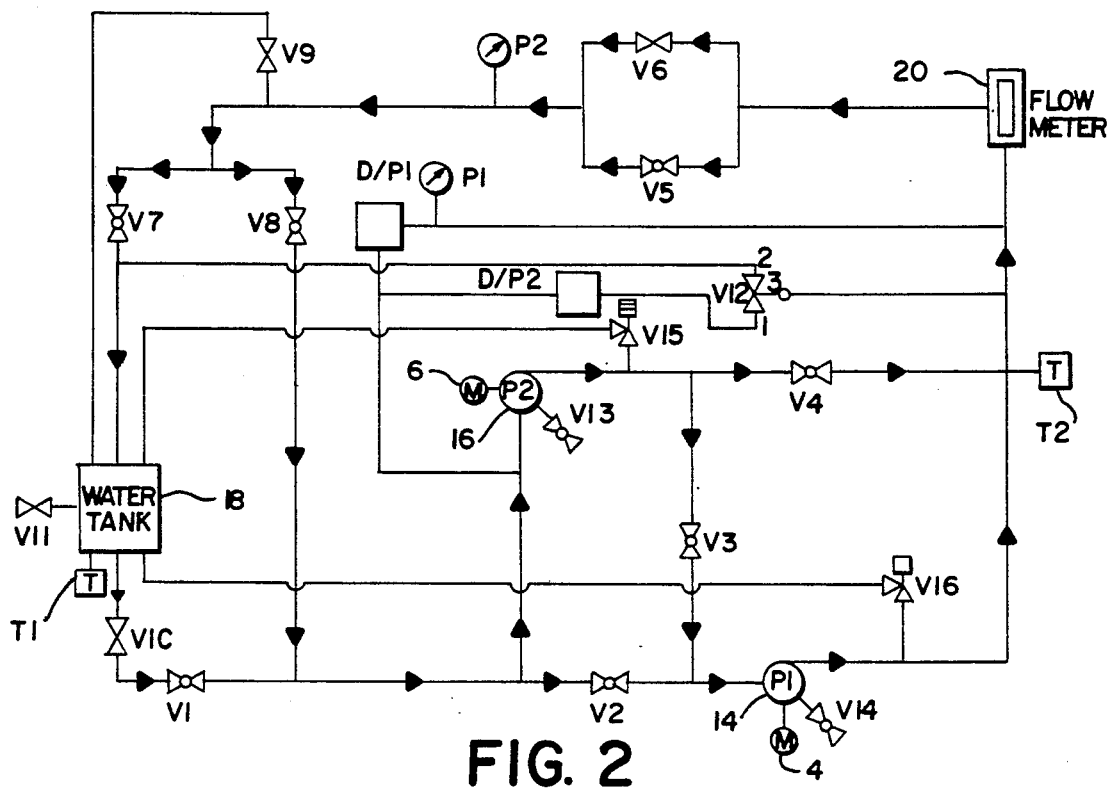
FIG. 2 is a schematic diagram of the piping system of the present invention.
Figure 3:
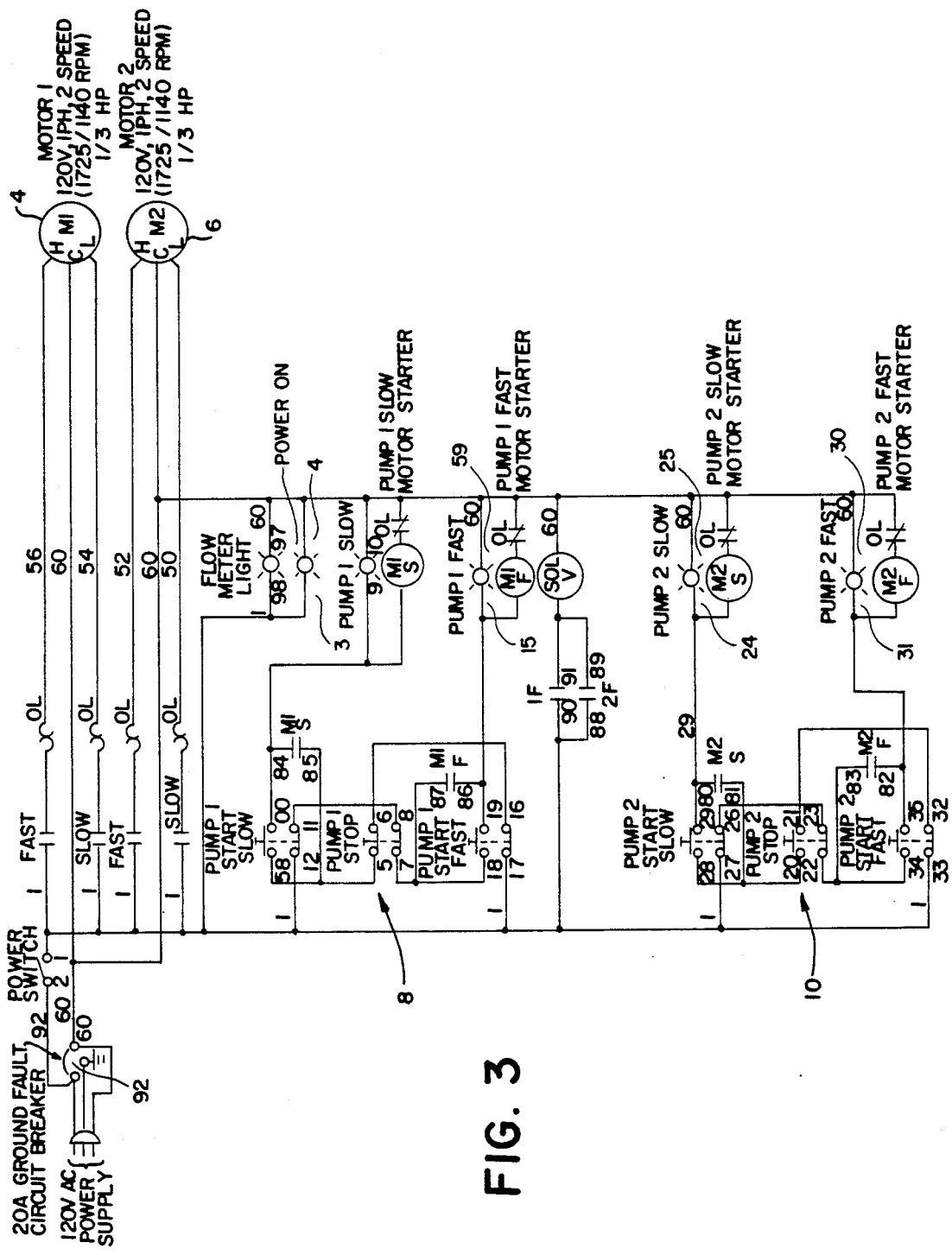
FIG. 3 is a simplified electrical schematic illustrating the connection of the motors and motor controllers of the present invention.

With reference to FIGS. 1 to 3, the Basic Fluid System Trainer has a mobile console 2 with plumbing and electrical components housed therein to provide a complete fluid system. The components utilized include two electrical motors 4 and 6, motor controllers 8 and 10, switches with indicating lights 12, two centrifugal pumps 14 and 16, pressure gauges P1(38) and P2(40), differential pressure gauges D/P1(34) and D/P2(36), and temperature gauges T1(32) and T2(30).

Each centrifugal pump 14 and 16 is driven by a corresponding one of electric motors 4 and 6 using a V-belt and pulleys. Each motor is capable of operating at two speeds (fast speed—1725 rpm, slow speed—1140 rpm) to provide two speed pump operation capability. The pumps are not self priming and are located below the liquid level of a tank 18. As is well known, for a conventional type of centrifugal pump, the liquid enters at a side of the pump (inlet), is thrown radially outward by a single rotating metal impeller, and exits at the top of the pump (outlet). The flow produced by the centrifugal pump is not positive, thereby permitting the discharge line to be throttled or shut completely for a brief period of time without danger of overloading the motor or bursting the flow lines. Centrifugal pump flow that is not positive means that a centrifugal pump, operating at constant speed, will deliver liquid at any capacity from zero to maximum depending on the pump size and system design factors.

Tank 18, preferably made of plastic with a capacity of approximately 16.8 gallons, acts as the reservoir for the system. The tank is located at a height of approximately 24" above the inlet of each of the pumps. In this position, the tank supplies liquid to prime the pumps and also supplies the necessary energy which makes it possible to effect flow through the system.

The piping in the trainer is mostly ¾" copper piping except at sections such as: from the pressure taps to the pressure gauges; to and from the solenoid valve, pump inlets and outlets, relief valves to the tank, and vent valve to the tank, which require Tygon tubing.

As shown in the schematic of FIG. 2, the closed system of the present invention, as defined by the connecting pipes (the arrows), is shown to have a number of valves V1 to V16. These valves are shown and represented by the valves on the front panel of the console of FIG. 1 and are to be discussed later. As shown in FIG. 2, the respective valves form a number of flow paths for the fluid contained within water tank 18. For example, a first flow path may be formed by valves V10, V1, V2, through pump 14 and flow meter 20, either one of valves V6 or V5, and valve V7. Another flow path may be made up of valves V10 and V1 through pump 16, valve V4, flow meter 20, either one of valves V5 or V6, and valve V7.

Furthermore, pumps 14 and 16 may be connected either in series or in parallel. For example, the pumps may be said to be connected in series if the fluid flows from pump 16 through valve V3 to pump 14 with valve V4 shut. On the other hand, for the parallel connection, the fluid would simultaneously flow to flow meter 20 by flowing through valve V2 and pump 14, as well as through pump 16 and valve V4, with valve V3 shut.

Although there are more valves shown in FIG. 2, as compared to those shown on the front panel of FIG. 1, it should be appreciated that valves such as valves V9 through V16 are actually either vent, drain, isolation, solenoid or relief valves and need not be represented in the front panel of FIG. 1. The vent and drain cock valves are required specifically for system initial fill and/or system maintenance. Moreover, differential pressure gauges D/P1 and D/P2 are used for measuring the difference in pressure between two points, as for example between the inlet and outlet of a pump.

As shown in FIG. 2, pumps 14 and 16 are driven by respective motors 4 and 6. The schematic showing the electrical connection of these motors is shown in FIG. 3. There, it can be seen that each motor can be regulated by motor controllers 8 and 10 to have different speeds, and that the operative state of each motor and its speed can be indicated with different lights, or display devices. It should be noted that these indicating lights are also represented on the power control panel, as 12.

The piping system shown in FIG. 2 and the electrical system illustrated in FIG. 3 are both housed within console 2. Since the connections of the respective systems are believed to be well known to one skilled in the art, for the sake of simplicity, the internal positioning of the different pipes, valves and electrical wirings will not be discussed.

Returning to FIG. 1, it can be seen that the power control panel is just one section of the 3-section front panel of the mobile console. The gauge panel section on the far left of the front panel has indicating devices to obtain information about the behavior of the fluid and system. The indicating devices include a system temperature gauge 30, tank temperature gauge 32, two differential pressure gauges 34 and 36, and two simplex pressure gauges 38 and 40.

System temperature gauge 30 indicates the system operating temperature and tank temperature gauge 32 indicates the tank temperature. Before the trainer is operated, the system and tank temperature gauges will indicate room temperature. While running the pumps, the system and tank temperatures will increase slightly. However, if the tank is bypassed while the pumps are being run, the tank temperature will remain constant, but system temperature gauge 30 will indicate a sharp increase in the system temperature.

The two differential pressure gauges 34 and 36 indicate respective differential pressures across the pumps (from inlet to outlet). Differential pressure gauge 34 (D/P1 in FIG. 2) is used to read the differential pressure when one or both pumps are operating in fast speed. D/P1 has a 0-30 psid scale with 0.5 graduations. This scale can be approximated to the nearest 0.25 psid. With one or both pumps operating in fast speed, only D/P1 will indicate differential pressure.

Solenoid valve V12 diverts flow (thus pressure) from differential pressure gauge 36 (D/P2 in FIG. 2) when the pumps are operating in fast speed. So with one or both pumps in fast speed, D/P2 should normally indicate 0 psid. However, due to a pressure tap from the low pressure side of the system to the D/P2 pressure port, D/P2 may have a reading greater than 0.0 with one or two pumps operating in fast speed.

D/P2 is used to indicate the differential pressure with one or both pumps operating in slow speed. D/P2 has a 0-20 psid scale with 0.2 graduations. This scale can be approximated to the nearest 0.1 psid. Both D/P1 and D/P2 will indicate differential pressures with only one pump operating in slow speed and the other pump off, or with both pumps operating in slow speed. However, only D/P2 is to be utilized for differential pressure readings in slow speed operation.

A simplex pressure gauge is located at the inlet and the outlet of throttle valve V6. Simplex pressure gauge 38 (P1 in FIG. 2) indicates pressure at the inlet of throttle valve V6 and has a 0-30 psid scale with 0.5 graduations. Simplex pressure gauge 40 (P2 in FIG. 2) indicates pressure at the outlet of throttle valve V6 and has a 0-15 psid scale with 0.25 graduations.

Adjacent to the gauge panel is the valve panel section. The valves on the valve panel consist of seven ¾" ball valves V1-V5 and V7-V8 and one ¾" globe valve V6. The functions of the seven ball valves identified on the valve panel are as follows:

| Valve Panel | Function |
| --- | --- |
| Valve No. 1 | Tank Outlet Valve (V1) |
| Valve No. 2 | Pump 1 Inlet Valve (V2) |
| Valve No. 3 | Series Connection Valve (V3) |
| Valve No. 4 | Pump 2 Outlet Valve (V4) |
| Valve No. 5 | Throttle Bypass Valve (V5) |
| Valve No. 7 | Tank Inlet Valve (V7) |
| Valve No. 8 | Tank Bypass Valve (V8) |

The ball valves can be open or shut in only one quarter (90°) turn of the valve handle. A ball valve is in the open position when the valve handle points in the direction of flow and is in the shut position when the valve handle points across the flow.

The function of globe valve V6 identified on the valve panel is as follows:

| Valve Panel | Function |
| --- | --- |
| Valve No. 6 | Throttle Valve (V6) |

The globe valve handle has a range of motion of approximately five complete (360°) turns.

Also located on the valve panel in the upper right hand corner is flow meter 20, which is used to indicate the volume flow rate through the system in gallons per minute (gpm). The flow meter's scale ranges from 0–16 gpm with 0.2 graduations from 1 to 13 gpm, 0.25 graduations from 13 to 14 gpm, and 0.05 graduations from 14 to 16 gpm.

The section on the far right of the front panel is the power control panel. The power control panel has a power switch 42, and pump control switches. Power switch 42 is an on and off toggle switch. A corresponding indicating light with a clear lens is mounted adjacent to power switch 42. The pump control switches are push on or push off buttons. The pump control switches include: pump no. 1 off switch, pump no. 1 slow speed switch and indicating light with a green lens, pump no. 1 fast speed switch and indicating light with a red lens; pump no. 2 off switch, pump no. 2 slow speed switch and indicating light with a green lens, and pump no. 2 fast speed switch and indicating light with a red lens.

By placing the power switch in the ON position, power is available to the control panel, indicated by the corresponding energized power indicating light. The flow meter light will also be energized with the power switch in the ON position. With the power switch in the ON position, depressing the slow speed start switch for one of the pumps starts the motor (and pump) in slow speed and energizes the slow speed indicating light for that pump. With the pump running in slow speed, the pump may be shut off by depressing the OFF switch (motor and pump will stop and the slow speed indicating light will deenergize), or the pump may be switched to run in fast speed by depressing the fast speed switch (slow speed indicating light deenergizes and the pump and motor will be operating in fast speed which will energize the fast speed indicating light). With the pump operating in fast speed, the pump may be shut off by depressing the OFF switch (motor and pump will stop and the fast speed indicating light will deenergize) or the pump may be switched to run in slow speed by depressing the slow speed switch (fast speed indicating light deenergizes and the pump and motor will be operating in slow-speed which will energize the slow speed indicating light).

It is important to remember that a pump can only be run at one speed at a time. Both motors (pumps) however, may be run at the same time in any speed combination. The possible combinations include:

| Pump 1 OFF | Pump 2 OFF |
| Pump 1 OFF | Pump 2 SLOW |
| Pump 1 OFF | Pump 2 FAST |
| Pump 1 SLOW | Pump 2 OFF |
| Pump 1 SLOW | Pump 2 SLOW |
| Pump 1 SLOW | Pump 2 FAST |
| Pump 1 FAST | Pump 2 OFF |
| Pump 1 FAST | Pump 2 SLOW |
| Pump 1 FAST | Pump 2 FAST |

Figure 4:
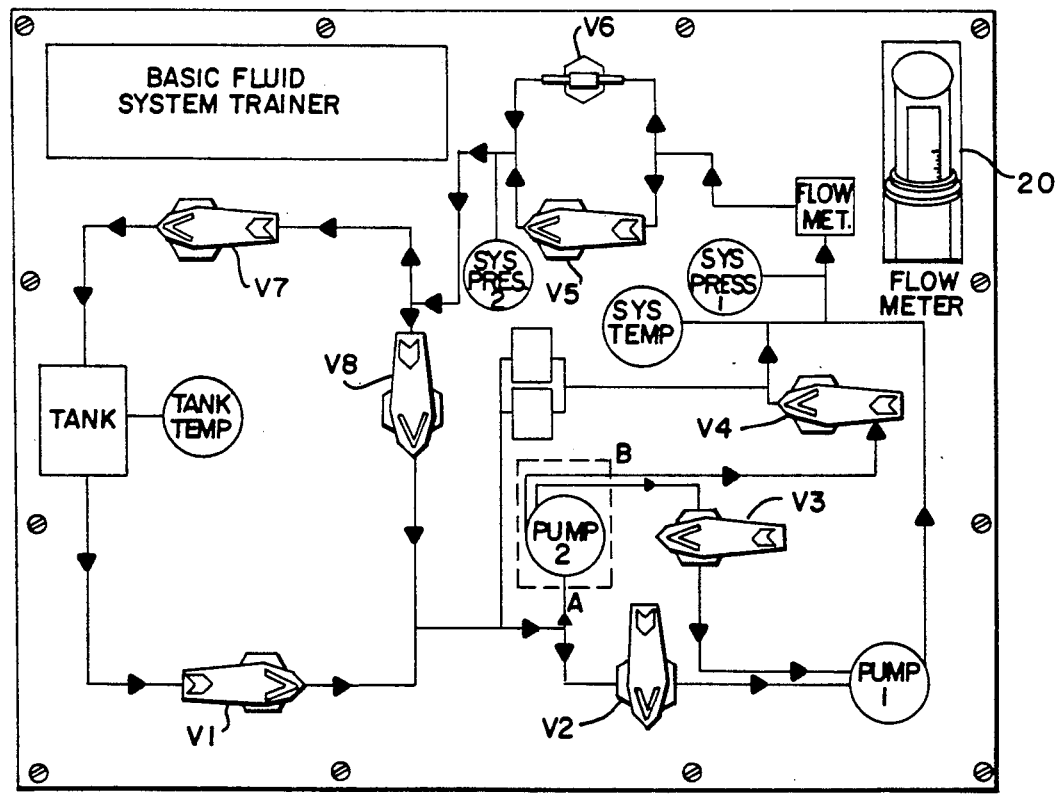
FIG. 4 is an enlarged view of the valve panel shown in FIG. 1 and is used in reference to the discussion of an example exercise to be performed on the trainer of the present invention.

To illustrate the operation of the trainer, the following examples are given. The first example deals with constructing pump curves for pump 2(16) operating in slow speed and fast speed. The pump curve is obtained by plotting pump head ($H_p$) vs. flow rate (V). $H_p$ is calculated from Bernoulli's equation with data from the trainer, and the flow rate is read from the flow meter. With reference to FIG. 4, for this example, the system, as indicated by the valve panel, consists of the boundary (----) drawn around pump 2 (16) as shown in FIG. 4 with point A being the pump inlet and point B being the pump outlet. The flow path through the system is also indicated in FIG. 4 by the position of the valve handles.

As is well known, Bernoulli's equation with head loss $h_L$ is written as:

$$\frac{gz_1}{g_c} + \frac{v_1^2}{2g_c} + \frac{P_1}{\rho_1} - h_L = \frac{gz_2}{g_c} + \frac{v_2^2}{2g_c} + \frac{P_2}{\rho_2}. \quad (1)$$

With the system shown in FIG. 4 by the boundary (----) being across a pump, a term must be added to Bernoulli's equation to take into account the energy per unit mass added by the pump. This term is known as pump head, $H_p$. So Bernoulli's equation now becomes:

$$\frac{gz_1}{g_c} + \frac{v_1^2}{2g_c} + \frac{P_1}{\rho_1} - h_L + H_p = \frac{gz_2}{g_c} + \frac{v_2^2}{2g_c} + \frac{P_2}{\rho_2}. \quad (2)$$

Rearranging equation (2) yields:

$$-h_L + H_p = \left(\frac{gZ_2}{g_c} - \frac{gZ_1}{g_c}\right) + \left(\frac{P_2}{\rho_2} - \frac{P_1}{\rho_1}\right) + \left(\frac{v_2^2}{2g_c} - \frac{v_1^2}{2g_c}\right). \quad (3)$$

A few assumptions can be made to simplify equation (3). With the pump inlet and outlet at the same elevation, the specific potential energy (potential energy per unit mass) term at point A and point B will be the same. When these are subtracted from each other, the difference is zero, so the net specific potential energy term in equation (3) is zero. With the inlet and outlet diameters the same, the velocities will be the same, so the net specific kinetic energy term will also be zero. Assuming no head loss across the pump (the net specific heat transferred and the change in specific internal energy are negligible across the pump, $h_L = Q - \Delta u = 0$) and constant density, equation (3) becomes $$H_p = \frac{P_2 - P_1}{\rho} \left[\frac{\text{ft-lb}_f}{\text{lb}_m}\right]. \quad (4)$$

$P_2 - P_1$ in equation (4) is the differential pressure across the pump and can be read from the appropriate differential pressure gauge. (For slow speed use D/P2, for fast speed use D/P1). With the density of water constant and taken to be 62.4 lbm/ft³ equation (4) becomes $$H_p = \frac{P_2 - P_1}{62.4 \text{ lbm/ft}^3} \left[ \frac{\text{ft-lb}_f}{\text{lb}_m} \right].$$

In order for the units of $H_p$ to be $$\frac{\text{ft-lb}_f}{\text{lb}_m}, P_2 - P_1$$

must have the units lbf/ft². These units can be obtained by multiplying the D/P gauge reading by the conversion factor $$\frac{144 \text{ in}^2}{\text{ft}^2}.$$

EXAMPLE $D/P = 10$ psid $$H_p = \frac{P_2 - P_1}{62.4 \text{ lbm/ft}^3} = \frac{10 \text{ lbf/in}^2 \, (144 \text{ in}^2/\text{ft}^2)}{62.4 \text{ lbm/ft}^3} = 23.1 \frac{\text{ft-lb}_f}{\text{lb}_m}$$

Different values of D/P (thus $H_p$) and flow rate are obtained by varying the position of the throttle bypass valve (V5) with the throttle valve (V6) shut. With the throttle bypass valve (V5) completely open, the maximum flow rate, minimum D/P, and thus minimum $H_p$ are obtained. As the throttle bypass valve (V5) is shut in small increments, the flow rate will decrease, D/P will increase, and $H_p$ will increase. Different values of $H_p$ thus are obtained with different values of D/P and flow rate.

Maximum $H_p$ and D/P will occur with the throttle bypass valve completely shut (no flow). The values of $H_p$ are plotted against their respective flow rates. The resulting curves are pump characteristic curves.

A second example for illustrating the combined pump curves for series and parallel operation of pumps in fast speed is given herein below, as determined experimentally, using data from the trainer and Bernoulli's equation, and analytically using data from the previous example for pump 2 in fast speed.

As discussed previously, a pump may operate alone in slow or fast speed or it may be operated in combination with another pump. The pump combinations may be in parallel or in series. Parallel operation of the pumps result in an increased flow rate, while series operation of pumps results in an increased pump head. The combination pump curve for a system with multiple pumps is obtained from the individual pump curve from the previous example. The fast speed pump curve data is utilized to obtain the combined pump curve for parallel or series operation of pumps in fast speed. For parallel operation of pumps in fast speed, the combined pump curve may be obtained by multiplying the flow rate through one pump at each value of pump head by two (for identical pumps). The flow rate will double at constant pump head:

$$\dot{V}(2 \text{ pumps}) = 2\dot{V}(1 \text{ pump})$$

$H_p =$ constant

For pumps operating in series, the combined pump curve may be obtained from the individual fast speed pump curve by multiplying the pump head for a single pump at each value of flow rate by two (for identical pumps). The pump head will double at constant flow rate:

$$H_p(2 \text{ pumps}) = 2 H_p(1 \text{ pump})$$

$\dot{V} =$ Constant

Figure 5A:
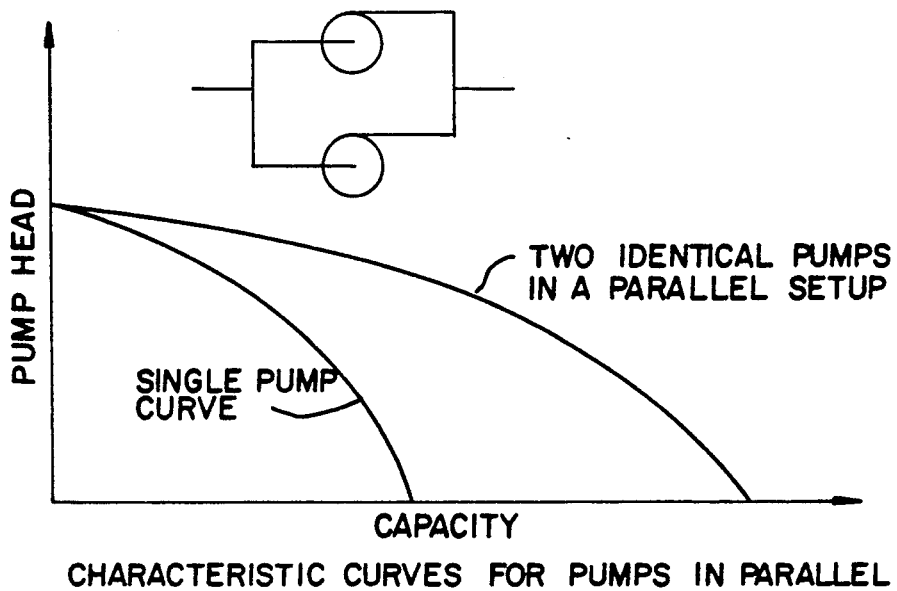
FIGS. 5A and 5B show respective example characteristic curves for pumps connected in parallel and in series.
Figure 5B:
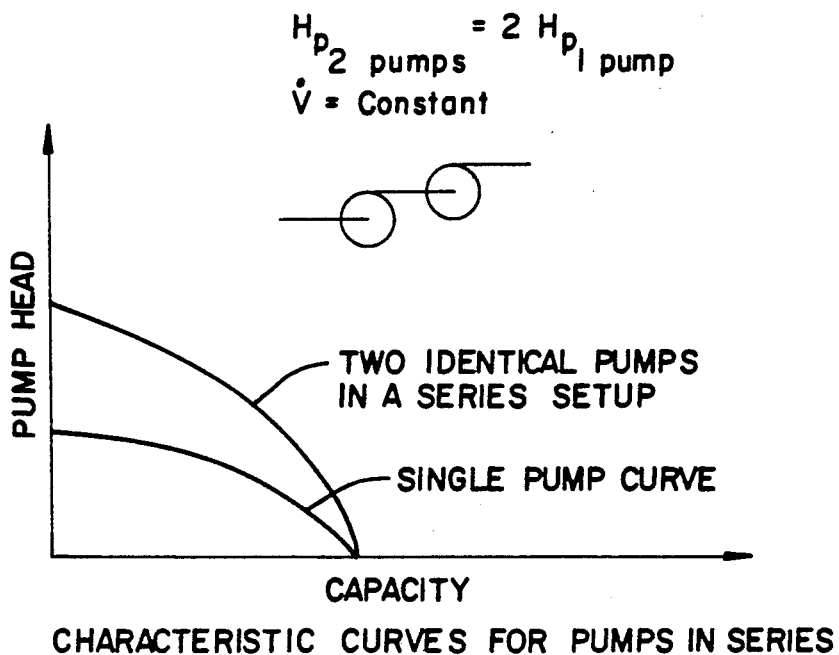

Characteristic curves for pumps connected in parallel and in series are shown in FIGS. 5A and 5B, respectively.

The characteristic curves for the pumps connected in parallel and in series can be effected by readjusting the valves shown on the valve panel. For example, with reference to FIG. 4, the position of valve V3, instead of turned to block flow of fluid from pump 2 to pump 1, can be turned to allow the flow of fluid from pump 2 to pump 1 and valve V4 can be turned to block the flow of fluid from pump 2 to the flow meter. This results in a flow path which connects pumps 1 and 2 in series.

The flow rate and D/P can be varied by adjusting the throttle bypass valve V5 with throttle valve V6 shut. The flow rate is read on flow meter 20 and D/P is read on the appropriate D/P gauge (34 or 36). The pump head is calculated for each D/P, and the flow rate vs. pump head may be plotted. The experimental and analytical curves, when plotted, should be similar.

For parallel operation of the pumps, again with reference to FIG. 4, the following valves are turned accordingly. Instead of turned to block the fluid flow from the tank to pump 1, as shown in FIG. 4, valve V2 is now turned to allow the fluid from tank 18, which flows past valve V1, to flow toward both pump 2 and pump 1. Thus, parallel operation of pumps 1 and 2 results. The respective positions of the remaining valves remain the same.

The flow rate for the parallel pump operation may be varied by again adjusting the throttle bypass valve V5 with throttle valve V6 shut. The pump head again may be calculated for each flow rate, and the flow rate vs. pump head can again be plotted. As before, the experimental and analytical curves, when plotted, should be very close to each other.

Inasmuch as the present invention is subject to many variations, modifications and changes in detail, it is intended that all matter described throughout the specification and shown in the accompanying drawings be interpreted as illustrative only and not in a limiting sense. Accordingly, it is intended that the invention be limited only by the spirit and scope of the appended claims.

We claim:

1. Apparatus for providing training of fluid theory in a closed piping system to at least one trainee, comprising:

a supply tank containing a fluid;
 at least two centrifugal pumps for circulating the fluid through the closed system;
 a corresponding number of multi-speed motors for driving the pumps;
 means for controlling the operation of the motors to selectively drive the pumps; and
 means for connecting the pumps to effect the circulation of the fluid flow serially or in parallel through different flow paths within the system;
 wherein the controlling means and the connecting means can be selectively operated and maneuvered to effect a plurality of flow paths for the circulation of the fluid within the piping system such that the flow rate and system resistance can be changed by altering pump configurations, and principles involving the flow of the fluid through the piping system may be presented to the trainee.

2. Apparatus according to claim 1, further comprising:
a plurality of measurement means positioned along chosen points within the system for sensing different operational characteristics of the system at the chosen points.

3. Apparatus according to claim 1, wherein the connecting means comprises a plurality of valves each of which can be selectively actuated to allow fluid to pass therethrough to effect the different flow paths.

4. Apparatus according to claim 1, further comprising:
a mobile console for carrying the supply tank, the pumps, the motors, the controlling means and the connecting means, the console providing mobility for the apparatus.

5. Apparatus according to claim 4, further comprising:
a panel integrated to an outer surface of the console, the panel including:
a first section having a plurality of means electrically connected to the measurement means for indicating the different operational characteristics sensed by the measurement means;
a second section having a plurality of actuating means each partaking in maneuvering the connecting means for effecting the different fluid flow paths; and
a third section having a plurality of switches representative of the controlling means for selectively driving the pumps at different speeds.

6. Apparatus according to claim 2, wherein the plurality of measurement means comprises flow meters, differential pressure gauges and remote reading thermometers.

7. Apparatus according to claim 3, wherein the plurality of valves comprises a plurality of ball valves and at least one globe valve.

8. Apparatus for providing fluid flow principles training, comprising:
a mobile console;
a supply tank containing a fluid housed within the console;
at least two centrifugal pumps for circulating the fluid within a closed system;
a corresponding number of multi-speed motors for driving the pumps;
means for controlling the operation of the motors to selectively drive the pumps;
means for connecting the pumps to effect circulation of the fluid flow serially or in parallel through different flow paths within the system; and
a plurality of measurement means positioned along chosen points within the system for sensing different operational characteristics of the system;
wherein the controlling means and the connecting means can be selectively operated and maneuvered to effect the different flow paths for the circulation of the fluid within the system such that the flow rate and system resistance can be changed by altering pump configurations, and different hydraulic concepts, represented by the different operational characteristics, may be presented to demonstrate the fluid flow principles.

9. Apparatus according to claim 8, wherein the connecting means comprises a plurality of valves each adaptable to allow fluid to pass therethrough to effect the different flow paths.

10. Apparatus according to claim 8, further comprising:
a plurality of display means electrically connected to the measurement means for displaying the different sensed operational characteristics;
a plurality of actuating means each adaptable to open or close one of the valves; and
a plurality of switches for activating the controlling means to selectively drive the pumps.

* * * * *